United States Patent [19]

Iwamoto et al.

[11] Patent Number: 4,986,386
[45] Date of Patent: Jan. 22, 1991

[54] APPARATUS FOR ADJUSTING THE TREAD OF STEERABLE WHEELS OF A VEHICLE

[75] Inventors: Masatoshi Iwamoto; Toshinobu Owada, both of Osaka, Japan

[73] Assignee: Kubota Ltd., Osaka, Japan

[21] Appl. No.: 401,847

[22] Filed: Sep. 1, 1989

[30] Foreign Application Priority Data

Oct. 18, 1988 [JP] Japan .................. 63-263709
Apr. 7, 1989 [JP] Japan .................. 1-88595
Apr. 7, 1989 [JP] Japan .................. 1-88596

[51] Int. Cl.⁵ ............................. B62D 7/20
[52] U.S. Cl. ..................... 180/209; 180/906; 280/638
[58] Field of Search ............... 180/209, 906; 280/638, 280/656, 80.1, 846

[56] References Cited

U.S. PATENT DOCUMENTS 2,604,332  7/1952  Kent ..................... 280/638
2,835,504  5/1958  Acker .................... 280/656
3,000,673  9/1961  Lansing .................. 280/638
3,782,491  1/1974  Herbenar ............. 280/638 X

FOREIGN PATENT DOCUMENTS 172802  10/1982  Japan .
59-28883  8/1984  Japan .

Primary Examiner—Charles A. Marmor
Assistant Examiner—Victor E. Johnson

[57] ABSTRACT

A movable case for making a steerable wheel steerable is slidably held in an axle case, a tie rod for a steering operation is made telescopically movable, and the movable case and the tie rod are arranged to be locked at an extended or retracted position. At the time of effecting tread adjustment, a steering wheel is rotated to its extreme end, and the vehicle is made to run with the movable case made slidable, which allows the movable case to slide outward through the axle case, permitting tread adjustment to be carried out automatically.

12 Claims, 12 Drawing Sheets

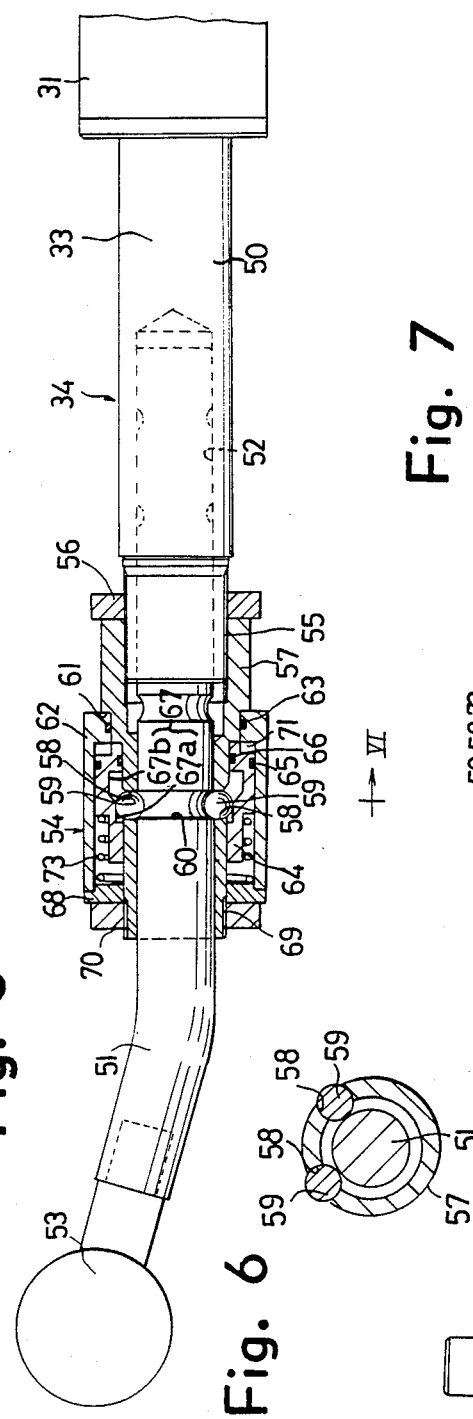

Fig. 17
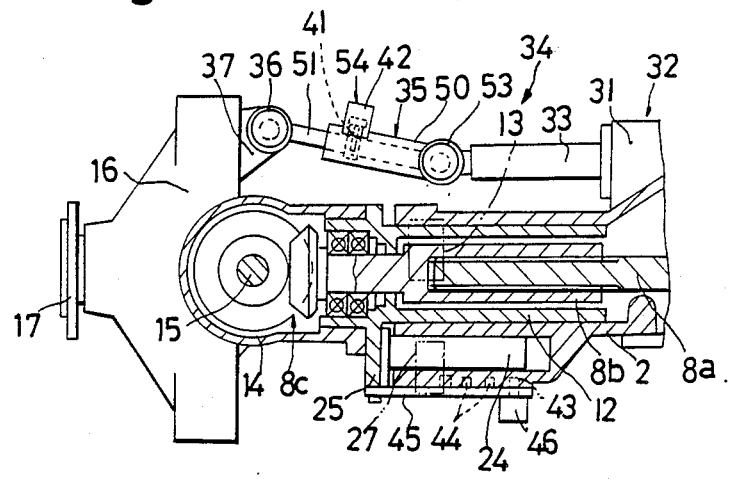
Fig. 18
Fig. 19
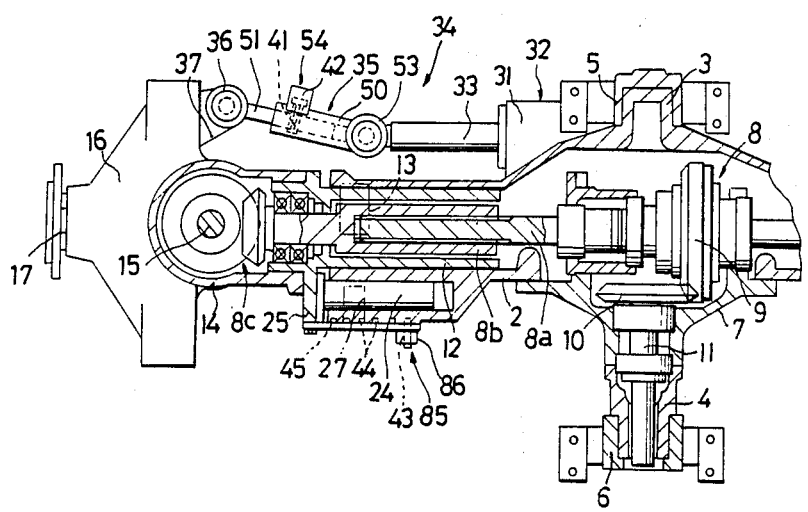

APPARATUS FOR ADJUSTING THE TREAD OF STEERABLE WHEELS OF A VEHICLE

FIELD OF THE INVENTION AND RELATED ART STATEMENT

The present invention relates to an apparatus for and a method of adjusting the tread of steerable wheels of a vehicle.

Conventionally, as an apparatus for adjusting the tread of steerable wheels of a vehicle such as a tractor, an apparatus is known in which a support for supporting the steerable wheels is slidably inserted at each opposite end of an axle case suspended from a chassis, and this support is made to undergo telescopic movement by means of a hydraulic cylinder (Japanese Patent Laid-Open No. 172802/1982). Also known is an apparatus in which a worm gear mechanism is provided instead of the hydraulic cylinder, and the support is made to undergo telescopic movement by means of this worm gear mechanism.

With an apparatus of this type, however, it is necessary to lift the axle case with a jack or the like at the time of tread adjustment, so that there is the drawback that the adjustment operation is cumbersome.

OBJECT AND SUMMARY OF THE INVENTION

Accordingly, an object of the present invention is to provide an apparatus for and a method of adjusting the tread of steerable wheels of a vehicle that are capable of adjusting the tread readily by making use of a steering mechanism without raising an axle case by means of a jack or the like or without adopting a complicated structure such as a hydraulic cylinder or a worm gear, thereby overcoming the above-described drawback of the conventional art.

An apparatus for adjusting the tread of steerable wheels of a vehicle has an axle case having a horizontal axis in a transverse direction and supported by a chassis. A pair of movable cases are respectively inserted into opposite ends of the axle case in such a manner as to be unrotatable about its axis and axially slidable. A wheel case is supported at an outer end of the movable case in such a manner as to be rotatable about a diagonally inclined vertical axis. A steerable wheel is rotatably supported by this wheel case. The steerable wheel has an alignment which produces running resistance in a direction returning to its position of straight forward running when it is steered to the right of left. The wheel cases are connected to each other by means of a pair of tie rods, which are arranged to be telescopically movable. The tie rod is moved to the left or right by a steering mechanism, and is adapted to rotate the wheel case about the diagonally inclined vertical axis. The telescopic movement of the tie rod is allowed or prevented by a rod lock means. The rod lock means is operated by remote control. The axial movement of the movable case is allowed or prevented by a case lock means. This case lock means is also operated by remote control.

A method of adjusting the tread by using the aforementioned apparatus for adjusting the tread of steerable wheels of a vehicle is as follows:

First, the rod lock means is unlocked so as to make the tie rod telescopically movable. The unlocking operation of this rod lock means is effected by remote control by the operator seated in a operator's cabin. Then, the tie rod is moved either left or right by the steering mechanism to cause the tie rod to extend or retract and, at the same time, one of the pair of steerable wheels is steered with the vehicle set at a standstill. The rod lock means is then locked to prevent the telescopic movement of the tie rod.

Then, the tie rod is moved in the opposite direction to that described above by means of the steering mechanism, the steered steerable wheel is returned to its position of straight forward running, and the steerable wheel on the opposite side is steered with the vehicle set at a standstill. Then, the case lock means on the side steered in the preceding step is unlocked to permit axial movement of the movable case.

The vehicle is then moved forward or backward, so that the steered steerable wheel returns to its position of straight forward running. When this steerable wheel returns to the position of straight forward running, the movable case is extended or retracted.

In accordance with the present invention, since the tie rod for steering is made telescopically movable and restrictable, it is possible to carry out the tread adjustment by making use of the alignment of the steerable wheels, and the adjustment operation can be performed very readily without any need to jack up the vehicle as conventionally practiced. Furthermore, since the rod lock means is operated by remote control, the operator seated in an operator's cabin can perform remote control, it is possible to carry out the tread adjustment while running the vehicle, thereby making the adjustment operation highly efficient.

The above and other objects, features and advantages of the present invention will become more apparent from the following detailed description of the invention when read in conjunction with the accompanying drawings.

BRIEF DESCRIPTION OF THE DRAWINGS

FIG. 5 is a top cross-sectional view of a rod lock means;

FIG. 6 is a cross-sectional view taken along the line VI—VI of FIG. 5;

FIG. 7 is a side cross sectional view of the rod lock means, illustrating a state in which said means is undergoing telescopic movement;

DESCRIPTION OF THE PREFERRED EMBODIMENTS

Figure 1:
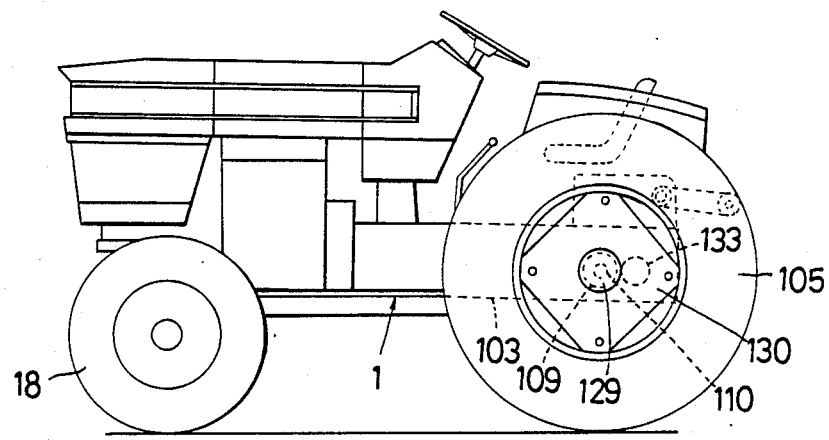
FIG. 1 is a side elevational view of a tractor.
Figure 2:
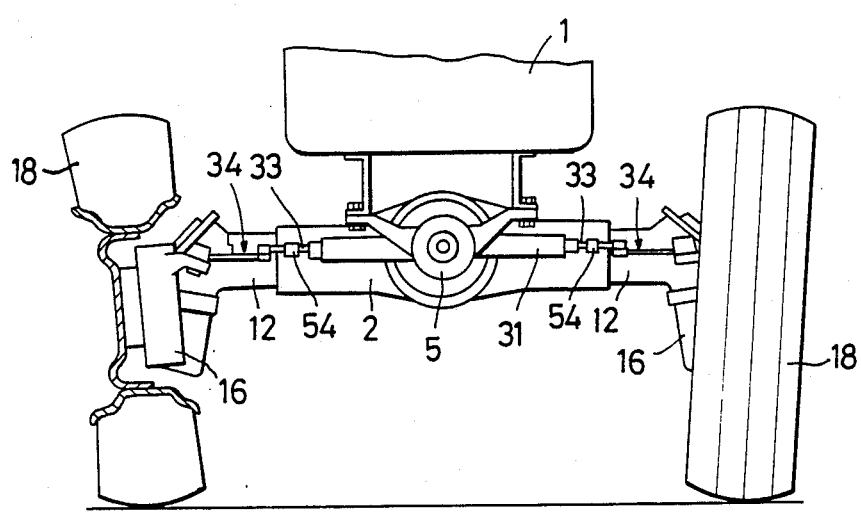
FIG. 2 is a front elevational view, partly in section, thereof.

Referring now to the accompanying drawings, a description will be given of the preferred embodiments of the present invention.

In FIGS. 1 through 4, a front axle case 2 is swingably suspended from a lower portion of a body 1 of an agricultural tractor at its front end via a pair of center axles 3, 4 and a pair of front axle brackets that are arranged longitudinally of the body 1. A front wheel deflector 8 is disposed in a central portion of the front axle case 2, and a pinion shaft 11 having a bevel pinion 10 meshing with a bevel gear 9 of the front wheel deflector 8 is inserted in that central portion, the pinion shaft 11 being interlockingly coupled with an unillustrated engine.

A cylindrically shaped movable case 12 is inserted in each transverse end of the front axle case 2 in such a manner as to be axially slidable. That is, the axle case 2 has an insertion hole 2a of a circular section for allowing the movable case 12 to be inserted therethrough, and this insertion hole 2a has a horizontal axis in a transverse direction. A gear case 14 is mounted on each outer end of the movable case 12, and a front wheel case 16 is steerably fixed to the gear case 14 in such a manner as to be rotatable about a king pin 15 having a diagonally inclined vertical axis. A steerable wheel 18, which is a front wheel, is supported by the front wheel case 16 via an axle 17.

This steerable wheel 18 has alignment which produces running resistance in the direction of returning to straight forward running when it is steered to the left or right.

The front wheel deflector 8 is adapted to transmit power to the steerable wheels 18 disposed on the left- and the right-hand sides via a deflector yoke shaft 8a, a transmission shaft 8b spline fitted therewith, a bevel gear mechanism 8c disposed in the gear case 14, the king pin 15, a final reducing gear provided in the wheel case 16, and the like.

Figures 3, 4:
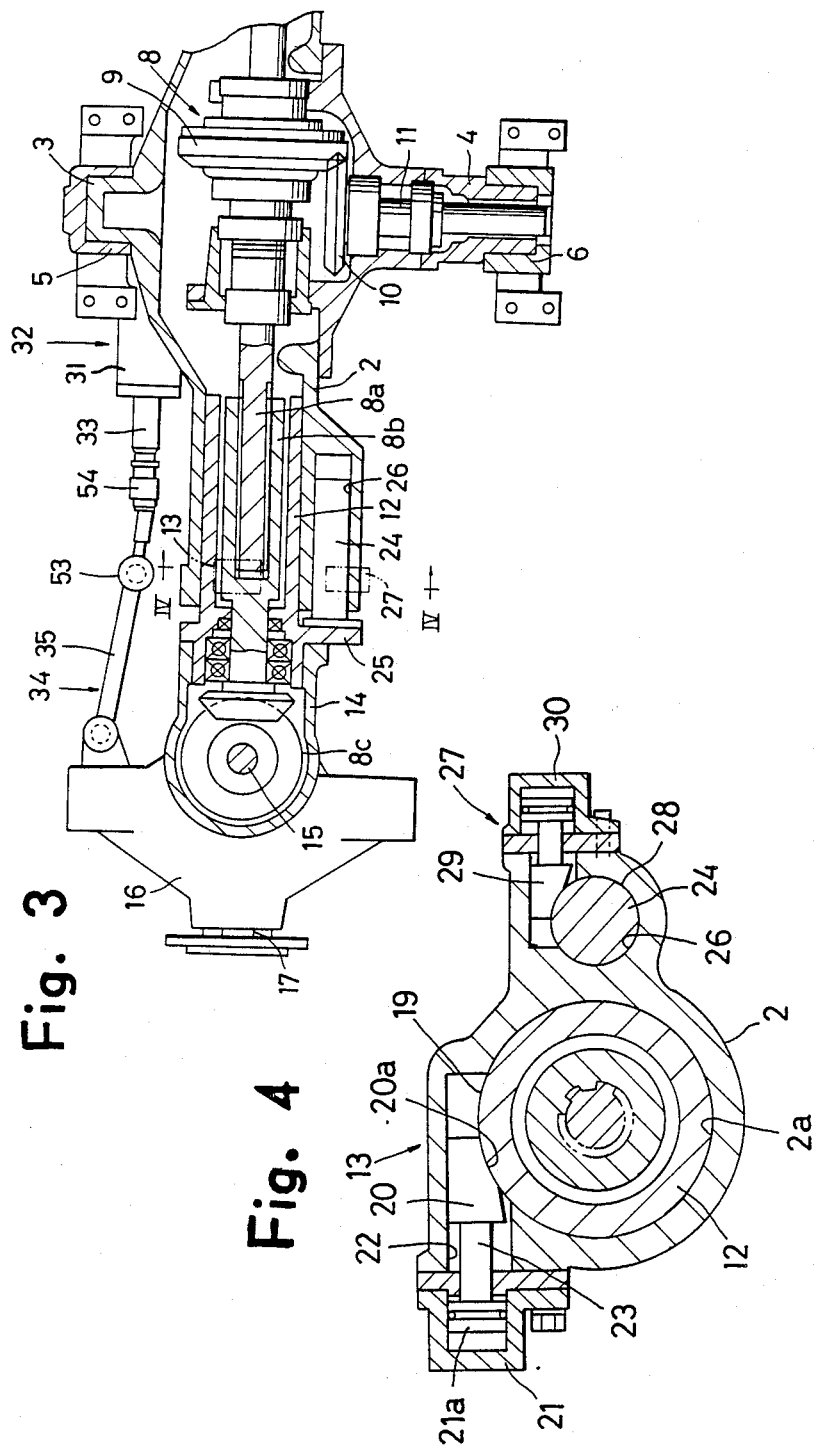
FIG. 3 is a top cross-sectional view of a tread adjusting apparatus.
FIG. 4 is a cross-sectional view taken along the line IV—IV of FIG. 3.

A case lock means 13 is provided in the front axle case 2 for restricting the sliding of the movable case 12 relative to the front axle case 2 so as to lock the movable case 12 at an arbitrary position. As shown in FIG. 4, this case lock means 13 has a pressure contacting member 20 for bringing the movable case 12 into pressure contact with the axle case 2, and this pressure contacting member 20 is constituted by a cotter pin 20 having an arcuate surface 20 a which can be brought into contact with or move away from a circular outer peripheral surface 19 of the movable case 12. The arrangement is such that this cotter pin 20 is operated by a hydraulic cylinder 21 so as to move in the direction of being brought into contact with or moving away from the outer peripheral surface 19. In other words, as the cotter pin 20 is brought into pressure contact with the outer peripheral surface 19, the movement of the movable case 12 is prevented, and as the cotter pin 20 is moved away from the outer peripheral surface 19, the movement of the movable case 12 is allowed. The cotter pin 20 is accommodated in a cotter insertion hole 22 provided in the front axle case 2 in a direction perpendicular to the axial direction thereof, and is connected to a piston 21a of the hydraulic cylinder 21 via a rod 23. The hydraulic cylinder 21 is of the double acting type and is secured to the front axle case 2, and an unillustrated control valve thereof can be operated by the operator seated in an operator's cabin of the tractor.

A rotation stopper 24 for preventing the rotation of the movable case 12 is disposed in the rear of the movable case 12 and parallel therewith, an outer end of the rotation stopper 24 being secured to a flange 25 of the movable case 12. The rotation stopper 24 is slidably inserted in a guide hole 26 formed in the rear of the front axle case 2, and the sliding movement thereof is restricted by a rotation lock means 27 so as to be locked at an arbitrary position. In other words, as shown in FIG. 4, the rotation lock means 27 has a cotter pin 29, which can be brought into contact with and move away from an outer peripheral surface 28 of the rotation stopper 24, and a double acting hydraulic cylinder 30 for operating the same, and the hydraulic cylinder 30 can be operated by the operator in the operator's cabin.

A steering mechanism 32 is provided on the front side of the front axle case 2, and the mechanism 32 has a hydraulic cylinder 31 for power steering disposed parallel with the axle case 2. This hydraulic cylinder 31 has a left (right) piston rod 33 which slides leftward or rightward in an interlocking relationship with the operation of an unillustrated steering wheel. The piston rod 33 constitutes a part of a left (right) tie rod 34 for steering, and a tie rod body 35 pivotally fitted at its outer end is pivotally secured to the wheel case 16. That is, the tie rod 34 comprises the piston rod 33 and the tie rod body 35.

The piston rods 33 of the left and right tie rods 34 are telescopically movable to the left or right. In other words, as shown in FIGS. 5 through 8, the piston rod 33 is formed by a first rod 50 on the inner end side and a second rod 51 on the outer end side, the second rod 51 being slidably inserted in an insertion hole 52 formed in alignment with the axis of the first rod 50. A ball joint 53 for coupling with the tie rod body 35 is fixed to an outer end of the second rod 51.

Also, a rod lock means 54 for restricting the telescopic movement of the left (right) piston rod 33 is provided in the steering mechanism 32. This rod lock means 54 is driven hydraulically.

Specifically, an externally threaded portion 55 is formed on an outer periphery of the first rod 50 at an outer end thereof, and a first lock nut 56 and an inner cylinder 57 are threadingly engaged with the externally threaded portion 55. The inner cylinder 57 has a stepped shape and extends axially outwardly of the first rod 50 in such a manner as to be axially slidable with respect to the outer periphery of the second rod 51.

Two ball retaining holes 58 are bored in a portion of the inner cylinder 57 that surrounds the outer periphery of the second rod 51. The positions of these ball retaining holes 58 are provided at unequal pitches with respect to the circumferential direction of the inner cylinder 57.

A positioning ball 59 is fitted in each ball retaining hole 58. In addition, a plurality of annular grooves 60 for allowing the positioning balls 59 to be detachably fitted therewith are formed at desired axial intervals on the outer periphery of the first rod 50.

An outer cylinder 62 is fitted over a step portion 61 on the outer periphery of the inner cylinder 57 at an axially intermediate portion thereof via an oil seal 63. A cylindrical slider 64 concentric with the inner and outer cylinders 57, 62 is axially slidably fitted between the outer cylinder 62 and the inner cylinder 57. An annular latch portion 67 for engaging with the positioning balls 59 is formed on an inner periphery of the cylindrical slider 64. This latch portion 67 has a portion 67a having a depth to prevent the disengagement between the positioning balls 59 and one of the annular grooves 60 and a depth 67b to allow the disengagement therebetween.

An annular closure member 68 is fitted over the outer periphery of the inner cylinder 57 at an axially outer end thereof, and an externally threaded portion 69 is formed around that outer periphery. A second lock nut 70 threadingly engaged with the externally threaded portion 69 makes it possible to maintain a state in which the closure member 68 abuts against the outer end surfaces of the inner and outer cylinders 57, 62.

The inner and outer cylinders 57, 62 and the slider 64 constitute a hydraulic device. Specifically, a space defined by the inner and outer cylinders 57, 62 and the slider 64 serves as an oil chamber 71, and a pressure oil supplying port 72 for supplying pressure oil to this oil chamber 71 is formed in the outer cylinder 62. This pressure oil supplying port 72 is connected via unillustrated pipelines to a pump, a control valve, and an oil tank (none are illustrated) that are mounted on the tractor. The control valve can be operated by the operator in the operator's cabin to control the supply of oil pressure In addition, a return spring 73 is fitted in a space defined by the outer cylinder 62, the slider 64, and the closure member 68.

Figure 8:
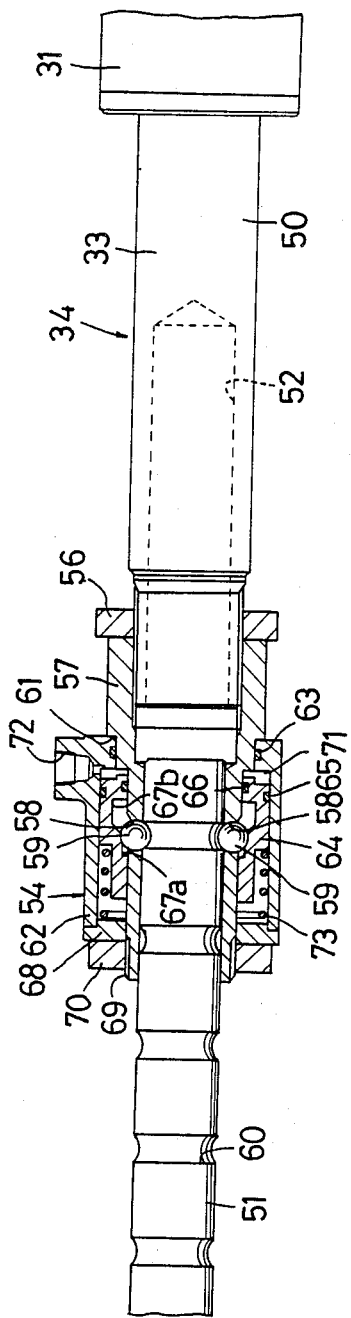
FIG. 8 is a side cross-sectional view of the rod lock means, illustrating a state in which the tie rod is extended.

As a result, when oil pressure is supplied to the oil chamber 71, the slider 64 moves leftward against the urging force of the return spring 73 from the state shown in FIG. 5. Then, as shown in FIG. 7, since the engagement between the positioning balls 59 and the annular groove 60 is cancelled, the second rod becomes axially movable with respect to the first rod 50, i.e., the piston rod 33 becomes telescopically movable. Then, as shown in FIG. 8, if the oil in the hydraulic chamber 71 is set in a state in which the oil can be drained to the tank after the positioning balls 59 are engaged with another annular groove 60 different from the one shown in FIG. 5, the slider 64 moves to the right by the urging force of the return spring 73, and the disengagement of the positioning balls 59 from the associated annular groove 60 is discontinued, thereby restricting the telescopic movement of the piston rod 33.

By virtue of the above-described arrangement, adjustment of the tread of the front wheels, which are steerable wheels, is effected by alternately moving the movable cases 12 in a telescopic manner.

Figure 9:
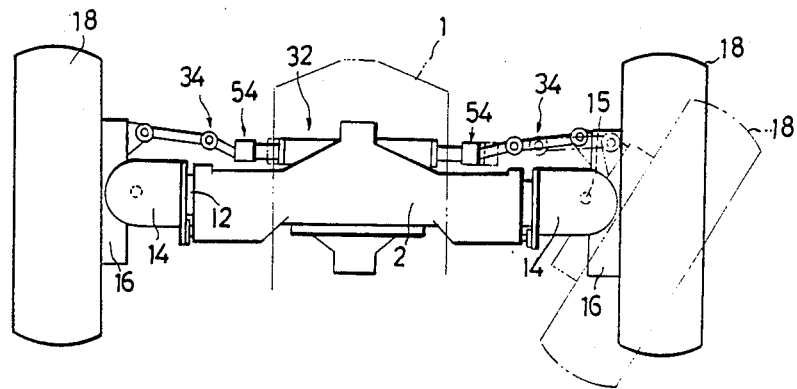
FIGS. 9 and 10 are top plan views explaining the operation.

For instance, in FIG. 9, to extend the left-hand movable case 12, the tractor is first set in its position of straight forward running, the restriction of telescopic movement of the left piston rod 33, which is a part of the left tie rod 34, by means of the left-hand rod lock means 54, as described before. Subsequently, if the hydraulic cylinder 31 is actuated by maneuvering the unillustrated steering wheel in such a manner as to steer the tractor to the right, the right-hand steerable wheel 18 is made to rotate about the king pin 15 with the vehicle set at a standstill as shown by a phantom line in FIG. 9, and the left tie rod 34 is telescopically extended with the left-hand steerable wheel 18 maintaining its position of straight forward running.

Then, when the left piston rod 33 reaches a desired length, the telescopic movement of the left piston rod 33 is restricted as described above by the rod lock means 54. In addition, the restriction of movement of the left-hand movable case 12 by the left-hand lock means 13 is cancelled as described above. Further, the restriction of sliding movement of the left-hand rotation stopper 24 by the left-hand rotation lock means 27 is cancelled as described above.

Figure 10:
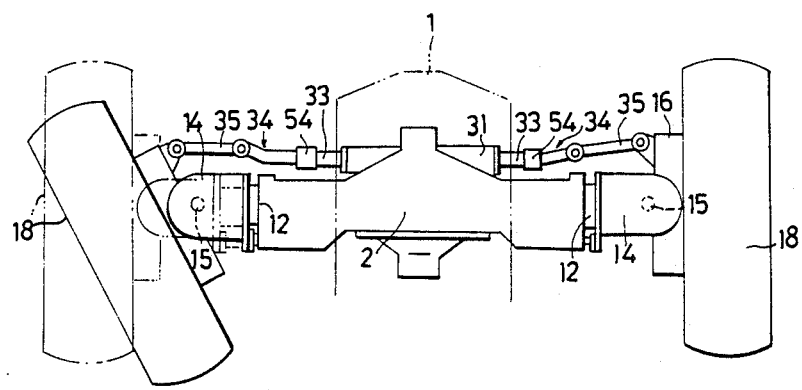

Subsequently, the steering wheel is maneuvered in such a manner as to shift the steering state from rightward steering to straight forward. Then, as shown by a solid line in FIG. 10, the left steerable wheel 18 rotates about the king pin 15 by the portion in which the left piston rod 33 is extended and in such a manner that its forward side moves toward the outside. If straight forward running is continued in this state, the left steerable wheel 18 tends to return to the position of straight forward running due to the running resistance caused by the alignment of steerable wheels, so that the left steerable wheel 18 rotates about the king pin 15 in such a manner that its rear side moves toward the outside. As a result, as shown by a phantom line in FIG. 10, the movable case 12 moves toward the outside by a distance corresponding to an extended portion of the left piston rod 33, so that the left steerable wheel 18 is set in the position of straight forward running. The movement of the left-hand movable case 12 is then restricted by the left-hand case lock means 13, and the sliding movement of the rotation stopper 24 is restricted by the left-hand rotation lock means 27. This completes tread adjustment for the left-hand side, and if tread adjustment for the right-hand side is effected in the same manner as the left-hand side, tread adjustment is completed.

In addition, when the tread is to be diminished, the steering wheel is maneuvered in such a manner that the piston rod 33 retracts after cancellation of the restriction of telescopic movement of the piston rod 33. Then, at the time of maneuvering the steering wheel in an opposite direction, it suffices if maneuvering is effected in such a manner that the steering direction becomes opposite to that in the case of FIG. 10, and other operations are the same as those described above.

Figure 11:
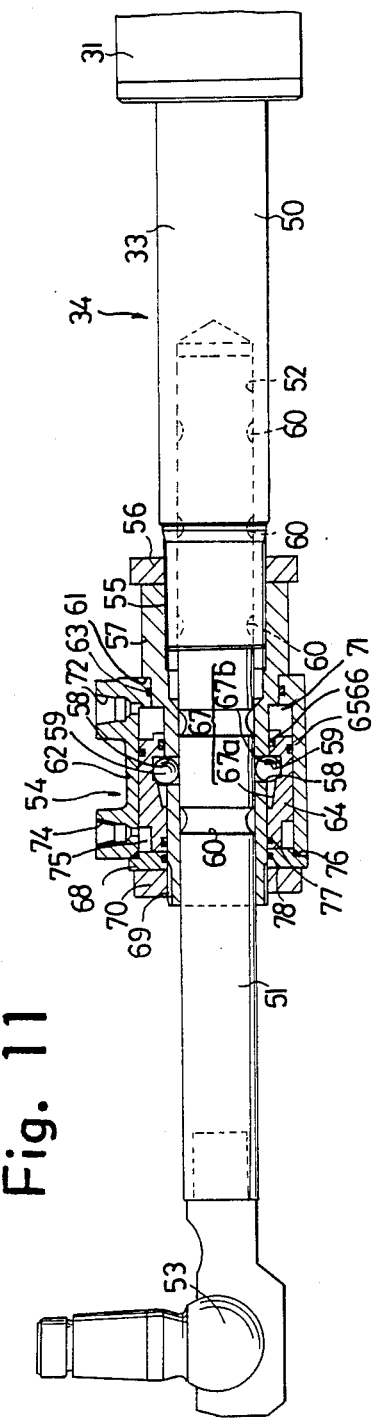
FIG. 11 is a side cross-sectional view of the rod lock means in accordance with another embodiment of the invention.

FIG. 11 illustrates a tread adjusting apparatus in accordance with another embodiment of the present invention. In this drawing, like parts are designated by like reference numerals, and the different features only will be described below.

As different features in construction, the rod lock means 54 is not provided with the return spring 73, a space defined by the outer cylinder 62, the slider 64, and the closure member 68 serves as an oil chamber 75, and a pressure oil supplying port 74 for supplying pressure oil to the oil chamber 75 is formed in the outer cylinder 62. This supplying port 74 and a supplying port 72 similar to the one used in the first embodiment are coupled via unillustrated pipelines with a pump, a control valve, and an oil tank (none are illustrated) that are mounted on the tractor.

As a result, the leftward movement, as viewed in the drawing, of the slider 64 is effected by supplying oil pressure to the oil chamber 71 and draining the oil in the oil chamber 75 to the tank, while the rightward movement, as viewed in the drawing, of the slider 64 is effected by supplying oil pressure to the oil chamber 75 and draining the oil in the oil chamber 71 to the tank. Oil seals 76, 77, 78 are respectively interposed between the inner cylinder 57 and the slider 64, between the inner cylinder 57 and the closure member 68, and between the closure member 68 and the outer cylinder 62.

Figure 12:
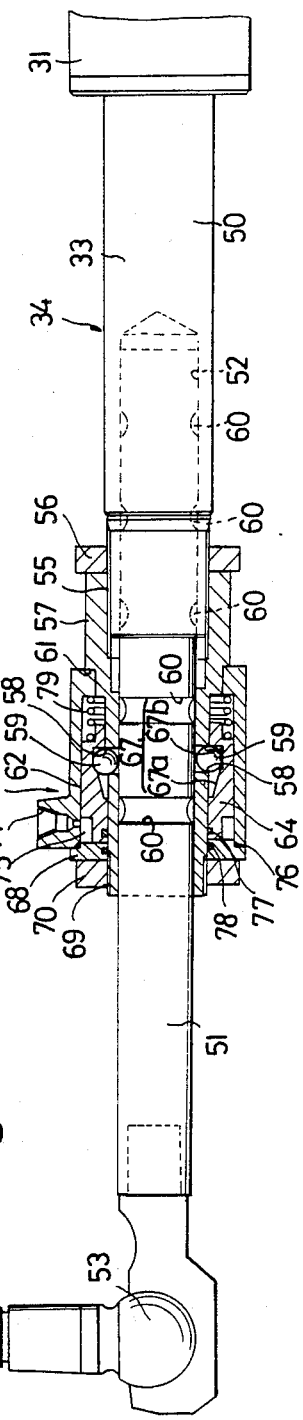
FIG. 12 is a side cross-sectional view of the rod lock means in accordance with still another embodiment of the invention.

FIG. 12 illustrates still another embodiment of the present invention. In this drawing, like parts are designated by like reference numerals, and the different features only will be described below.

As a different feature, the rod lock means 54 is provided with the oil chamber 75, oil pressure supplying port 74, and oil seals 76, 77, 78 similar to the preceding embodiment. In addition, the return spring 73, oil chamber 71, oil pressure supplying port 72, and oil seals 63, 65, 66 are not provided, and a return spring 79 is interposed in a space defined by the inner and outer cylinders 57, 62 and the slider 64.

As a result, the leftward movement, as viewed in the drawing, of the slider 64 is effected by draining the oil in the oil chamber 75 to the tank to allow the urging force of the return spring 79 to act, while the rightward movement, as viewed in the drawing, of the slider 64 is effected by supplying oil pressure to the oil chamber 75 against the urging force of the return spring 79.

Figure 13:
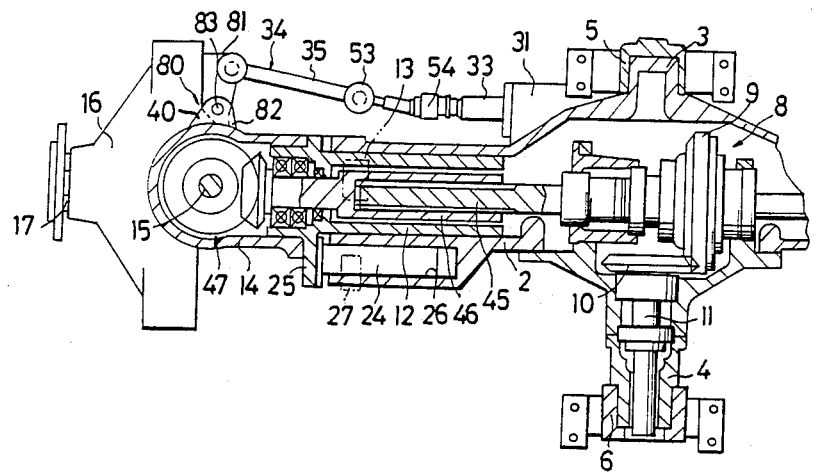
FIG. 13 is a top cross-sectional view of a tread adjusting apparatus in accordance with a further embodiment of the invention.
Figure 14:
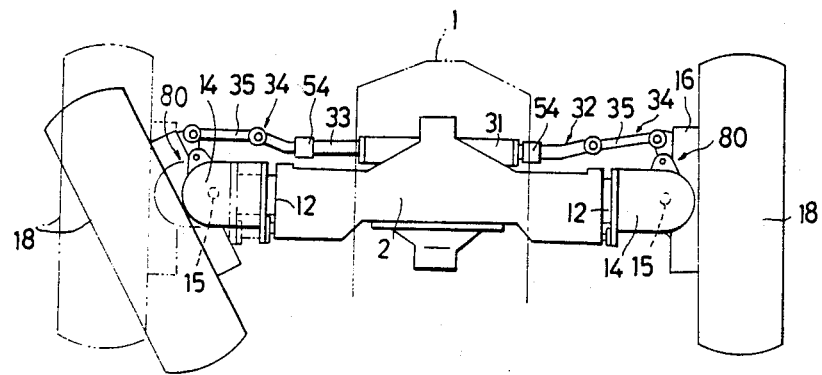
FIG. 14 is a diagram explaining the operation.

FIGS. 13 and 14 illustrate a further embodiment of the present invention. In these drawings, parts that are identical with those of the foregoing embodiments are designated by like reference numerals, and the different features only will be described below.

First, as a different feature, a wheel case rotation restricting means 80 is provided to restrict the rotation of the wheel case 16 relative to the movable case 12 in such a manner as to lock said rotation. The wheel case rotation restricting means 80 is arranged such that a lock pin 83 is detachably inserted into a bracket 81 projecting from the wheel case 16 and a bracket 82 projecting from the gear case 14. The rotation of the wheel case 16 is restricted by the insertion of the lock pin 83, and the restriction is cancelled by withdrawal thereof. It should be noted that the insertion and withdrawal of the lock pin 83 may be effected by the provision of a hydraulic cylinder.

As a result, tread adjustment of the steerable wheel 18 is carried out by alternately moving the left and right movable cases in a telescopic manner.

For example, when the left-hand side is to be extended, the tractor is steered to be set in the position of straight forward running, and the rotation of the right-hand wheel case 16 is restricted by the right-hand wheel case rotation restricting means 80. In addition, the restriction of telescopic movement of the right piston rod 33, which is a part of the right tie rod 34, by the right-hand rod lock means 54 is cancelled. Meanwhile, the restriction of movement of the left-hand movable case 12 by the left-hand case lock means 13 is also cancelled. Furthermore, the restriction of sliding movement of the left hand rotation stopper 24 by the left-hand rotation lock means 27 is also cancelled. In this state, if the cylinder 31 is operated by maneuvering the steering wheel in such a manner as to steer the tractor to the left, as shown by a solid line in FIG. 14, the left-hand steerable wheel 18 rotates about the king pin 15 in such a manner that its forward side moves toward the outside. At this time, the right-hand tie rod 34 extends with the right-hand steerable wheel 18 maintaining its position of straight forward running. If forward running is continued in this state, as shown by a phantom line in FIG. 14, the left-steerable wheel 18 returns to its position of straight forward running due to the running resistance resulting from the alignment of the front wheels, and the movable case 12 moves toward the outside by a distance corresponding to an extended portion of the right piston rod 33. Then, the movement of the left-hand movable case 12 is restricted by the left-hand case lock means 13, the sliding motion of the rotation stopper 24 is restricted by the left-hand rotation lock means 27, the telescopic movement of the right piston rod 33 is restricted by the right-hand rod lock means 54, and the restriction of rotation of the right-side steerable wheel 18 by the right-hand wheel case rotation restricting means 80 is cancelled. This completes tread adjustment for the left-hand side, if tread adjustment for the right-hand side is carried out in the same manner as the left-hand side, tread adjustment is completed.

In addition, when the tread is to be diminished, it suffices if, after cancellation of the restriction of telescopic movement of the piston rod 33, the steering wheel is maneuvered in such a manner that the piston rod 33 retracts, and if the steerable wheel 18 is made to rotate in the opposite direction to that shown in FIG. 14.

Figure 15:
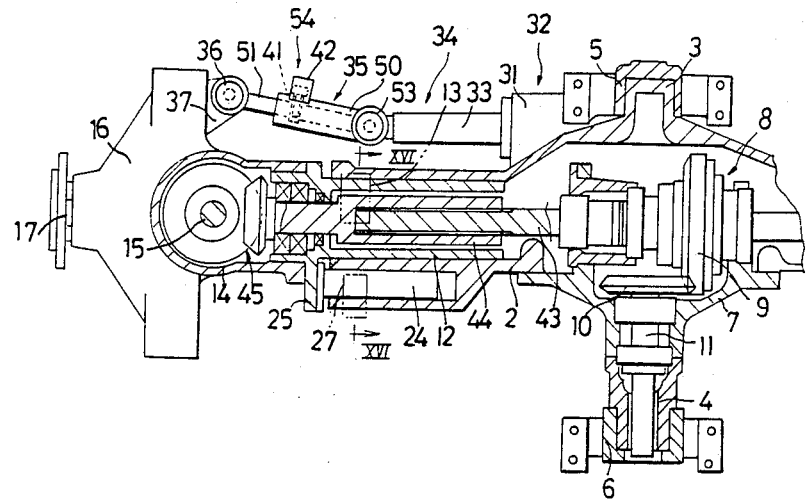
FIG. 15 is a top cross-sectional view of a tread adjusting apparatus in accordance with a further embodiment of the invention.
Figure 16:
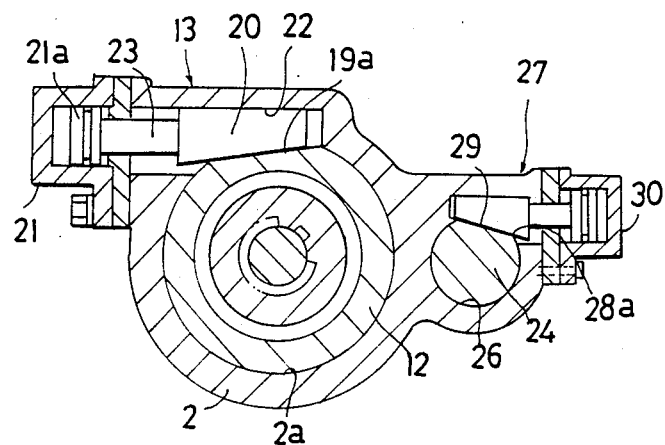
FIG. 16 is a cross-sectional view taken along the line XVI—XVI of FIG. 15.

FIGS. 15 and 16 illustrate a still further embodiment of the present invention. In these drawings, parts that are identical with those of the foregoing embodiments are designated by like reference numerals, and the different features only will be described below.

First, as shown in FIG. 16, the case lock means 13 differs from the one described above. Specifically, the cotter pin 20 is capable of being brought into contact with and moving away from a flat surface 19a formed on an upper surface of the movable case 12.

In addition, the cotter pin 29 of the rotation lock means 27 is also arranged to be brought into contact with and moving away from a flat surface 28a of the rotation stopper 24.

Furthermore, the specific arrangements of the tie rod and the rod lock means differ from those of the foregoing embodiments.

In other words, the left and right-hand opposite ends of the piston rod 33 are coupled with a bracket 37 of the wheel case 16 via a tie rod end 53, tie rod body 35, and tie rod end 36. The tie rod body 35 comprises a cylindrically shaped first rod 50 and a second rod 51 internally fitted therewith, whereby the tie rod body 35 is adapted to extend telescopically. In addition, the tie rod body 35 can be locked at an arbitrary length of telescopic movement by the rod lock means 54. In the same way as the case lock means 13, the rod lock means 54 has a cotter pin 41 and a hydraulic cylinder 42.

Figure 17:
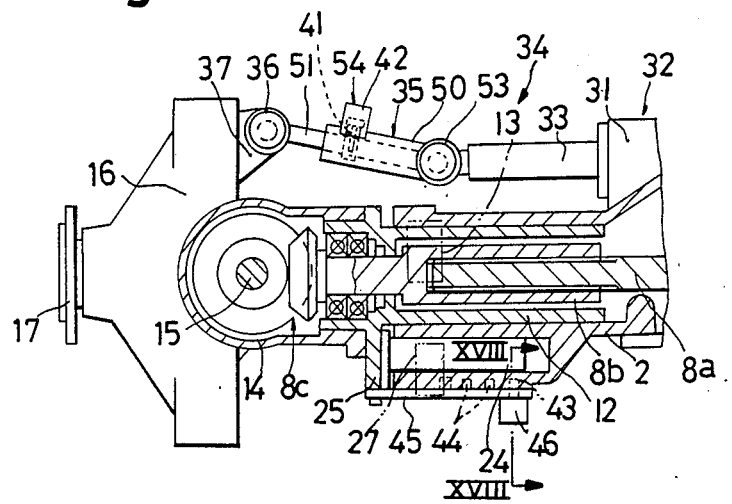
FIG. 17 is a top cross-sectional view of a tread adjusting apparatus in accordance with a still further embodiment of the invention.
Figure 18:
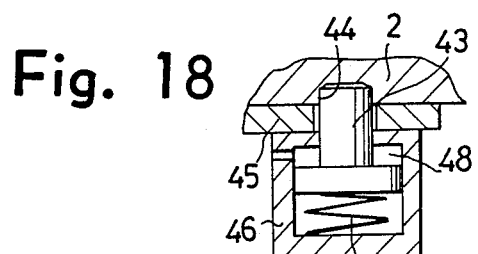
FIG. 18 is a cross-sectional view taken along the line XVIII—XVIII of FIG. 17.
Figure 19:
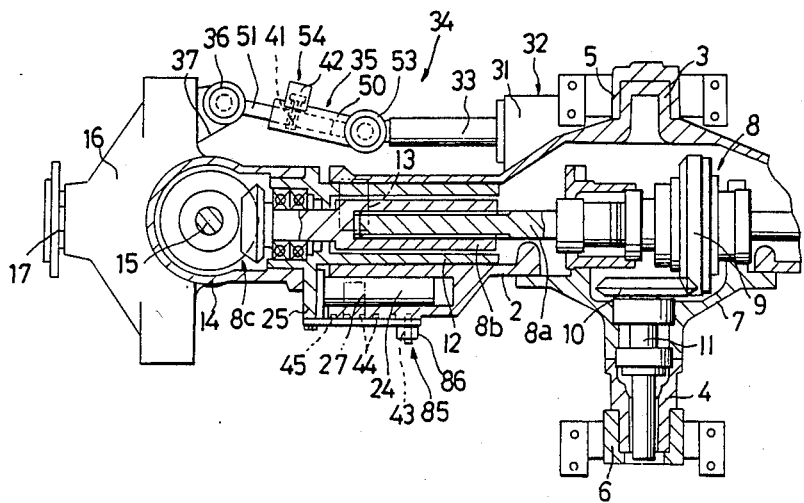
FIG. 19 is a top cross-sectional view of a tread adjusting apparatus in accordance with a further embodiment of the invention.
Figure 20:
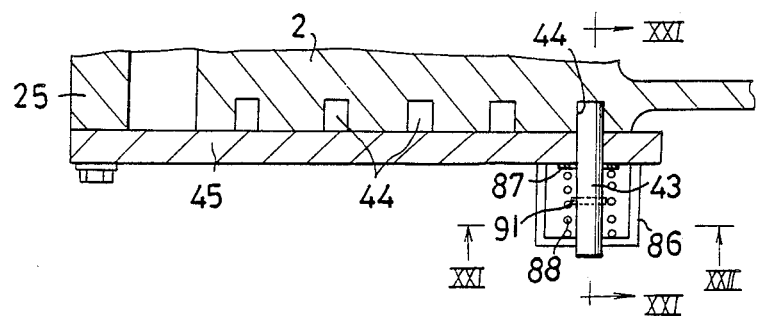
FIG. 20 is an enlarged view of an essential portion shown in FIG. 19.
Figure 21:
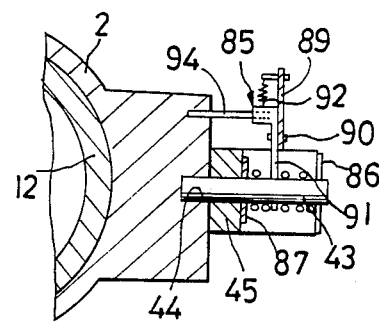
FIG. 21 is a cross-sectional view taken along the line XXI—XXI of FIG. 20.
Figure 22:
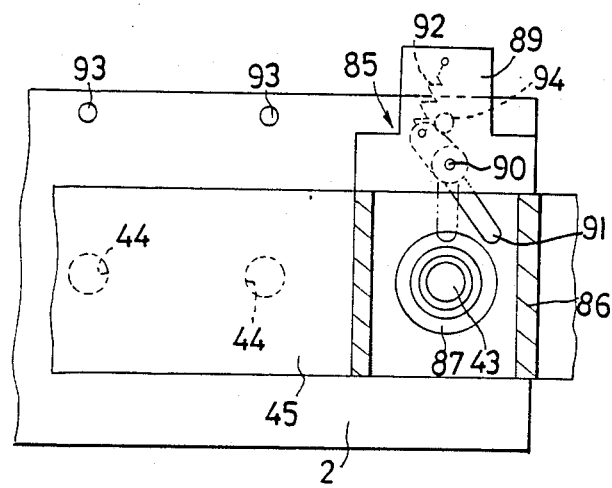
FIG. 22 is a cross-sectional view taken along the line XXII—XXII of FIG. 20.

Also, as shown in FIG. 17, it is possible to adopt a locking structure by means of a lock pin 43 in combination with the lock obtained by the frictional forces of the lock means 13, 27. This locking structure is arranged such that a plurality of engaging holes 44 are bored in the axle case 2 at predetermined intervals, and the lock pin 43 provided on a fixing plate 45 secured to the flange 25 of the movable case 12 is engaged with an arbitrary one of the engaging holes 44. As shown in FIG. 18, the arrangement is such that the lock pin 43 is constantly urged by a spring 47 disposed in the hydraulic cylinder 46 in an engaging direction and, at the time of disengagement, the oil pressure is supplied to the chamber 48 in the hydraulic cylinder 46 so as to disengage the lock pin 43 against the urging force of the spring 47.

FIGS. 19 through 22 illustrate a further embodiment of the invention, in which a setting means 85 is added. If the length of telescopic movement of the movable case 12 is set by this setting means 85, the lock pin 43 is automatically engaged with one of the engaging holes 44 when the movable case 12 is slid to that length.

Specifically, the lock pin 43 is slidably supported by the fixing plate 45 and a support frame 86 secured thereto, and is resiliently pressed toward the front axle case 2 side by a spring 88 interposed between a disk 87 fixed in the center and the support frame 86.

A stopper 91 is pivotally supported by a bracket 89 secured to the support frame, via a pin 90. Although this stopper 91 is arranged to be swingable, but return to its engaging position (a vertical position designated by a two-dotted chain line in FIG. 22) is by means of a tension spring 92 interposed between one end thereof and the bracket 89. A lower portion of this stopper 91 is engageable with the disk 87 of the lock pin 43 disengaged from the engaging hole 44, and this engagement makes it possible to keep the lock pin 43 in a disengaged state. Pin holes 93 are formed in an upper portion of the front axle case 2 in correspondence with the respective engaging holes 44, a position setting pin 94 being inserted in one of the pin holes 93. This position setting pin 94 is capable of abutting against an upper portion of the stopper 91, and the stopper 91, when brought into contact with the position setting pin 94, swings against the urging force of the tension spring 92, whereby the stopper 91 is disengaged from the disk 87, thereby allowing the lock pin 43 to be inserted into the engaging hole 44.

Accordingly, at the time of adjusting the tread, the lock pin 43 is held in a disengaged state by the stopper 91, the position setting pin 94 is inserted into one of the pin holes 93 corresponding to the tread to be obtained, and, in this state, the movable case 12 is made to slide while the tractor is run in the same manner as described above. Then, the stopper 91 is brought into contact with the position setting pin 94 and consequently swings, allowing the lock pin 43 to engage with one of the engaging holes 44, whereby the movable case 12 is automatically locked at the set length.

Figure 23:
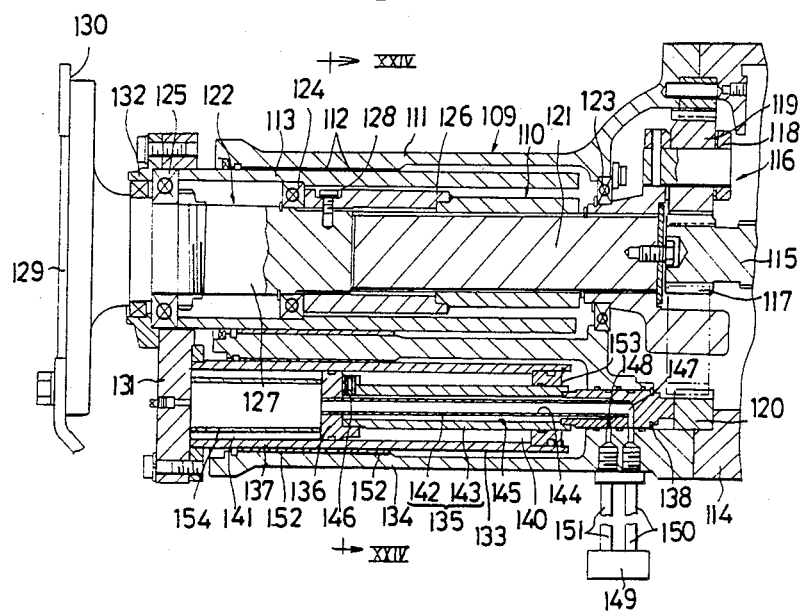
FIG. 23 is a cross-sectional view for an apparatus of adjusting the tread of rear wheels.
Figure 24:
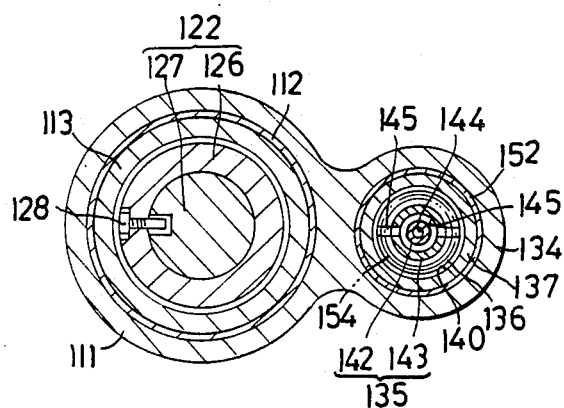
FIG. 24 is a cross-sectional view taken along the line XXIV—XXIV of FIG. 23.

FIGS. 23 and 24 illustrate a tread adjusting apparatus for a rear wheel 105.

A pair of rear wheels 105 are respectively mounted on transversely opposite sides of a transmission case 103 via a rear axle case 109 and a rear axle 110.

The rear axle case 109 comprises a fixed case 111 and a movable case 113 internally fitted therewith in such a manner as to be axially slidable via a bush 112, whereby the rear axle case 109 is adapted to extend telescopically. The fixed case 111 is mounted on the transmission case 103 via brake case 114. Disposed in the brake case 114 is a brake device (not illustrated) for controlling a deflector yoke shaft 115 projecting to the left and right from the deflector disposed in the transmission case 103. The deflector yoke shaft 115 is interlockingly coupled with the rear axle 110 via a planetary reducing gear 116. The planetary reducing gear 116 comprises a sun gear formed integrally with the deflector yoke shaft 115, a holder 118, a planetary gear 119, or a ring gear 120, and so on.

The rear axle 110 comprises a first axle 121, which is a body-side axle, and a second axle 122, which is a rear wheel-side axle, the first axle 121 being supported by the fixed case 111 via a ball bearing 123.

The second axle 122 is supported by the movable case 113 via ball bearings 124, 125, and comprises an inner cylindrical spline shaft 126 and an outer solid shaft 127, the latter being splined and fixed by means of a fixing means 128 such as a bolt.

In addition, the cylindrical spline shaft 126 of the second axle 122 is splined to the first axle 121, and the rear axle 110 is capable of extending telescopically in the axial direction thereof.

A disk 130 of the rear wheel 105 is fixed to a flange 129 of the solid axle 127 of the second axle 122, and the ball bearing 125 is disposed on an interlocking member 131 secured to an outer end of the movable case 113 by means of a bearing cover 132.

A hydraulic cylinder is disposed on the rear side of the rear axle 110 in parallel therewith and is accommodated in a holding case 134 formed integrally with the fixed case 111, whereby the the rear wheel 105 is moved sideways.

The hydraulic cylinder 133 comprises a piston rod 135 extending outwardly of the body 1, a piston 136 secured to an outer end of the piston rod 135, and a cylinder body 137 externally fitted over the piston 136 and the piston rod 135 in such a manner as to be axially slidable.

The movement of the piston rod 135 in the outward direction is restricted by a stopper ring 138 on the inner end side of the holding case 134, and the piston rod 135 is brought into contact with the transmission case 103 via the ring gear 120, thereby restricting its movement in the inward direction. The piston 136 serves to partition the interior of the cylinder body 137 into inner and outer oil chambers 140, 141.

The piston rod 135 is constituted by inner and outer cylinders 142, 143 which form a double structure in a mutually fitted state, the inner cylinder 142 together with an inner end of the outer cylinder 143 being inserted in the piston 136. The interior of the inner cylinder 142 serves as an oil passage 144 for supplying hydraulic oil to the outer oil chamber 141, and a space defined between the inner and outer cylinders 142, 143 serves as an oil passage 145 for supplying hydraulic oil to the inner oil chamber 140, a communicating hole 146 being formed in the outer cylinder 143 and the piston 136 for allowing the oil passage 145 and the inner oil chamber 140 to communicate with each other.

Formed at inner ends of the outer cylinder 143 an the holding case 134 are oil passages 147, 148 communicating with the oil passages 144, 145, respectively, in such a manner as to extend from the rear end surfaces toward the front. A control valve 149 for controlling the hydraulic cylinder 133 is connected to the respective oil passages 147, 148 via oil pressure pipes 150, 151.

The cylindrical body 137 is internally fitted with the holding case 134 via a bush 152 in such a manner as to be slidable, and its opening at the inner end thereof is closed with a cover 153. As the cover 153 is brought into contact with the piston 136, the sliding movement of the cylindrical body 137 in the outward direction is restricted.

The interlocking member 131 is fixed to the outer end of the cylinder body 137, and an opening in the cylinder body 137 at an outer end thereof is closed by this interlocking member 131.

A cylindrical stopper 154 is fitted loosely in an outer end portion of the cylinder 137, the sliding movement of cylinder body 137 in the inward direction by more than a predetermined amount is restricted by this stopper 154. The stopper 154 is formed separately from the piston 136 and the interlocking member 131, or formed integrally with either one of them.

In accordance with the above-described embodiment thus constructed, at the time of adjusting the tread of the rear wheels 105, the control valve 149 is operated to cause the rear axle 110 to extend or retract, moving the rear wheels 105 in the leftward or rightward direction.

For instance, when the rear wheel 105 is to be moved outwardly, hydraulic oil is supplied to the outer oil chamber 141 via the hydraulic pressure pipes 150 and the oil passages 147, 144.

Consequently, the cylinder body 137 moves in the outward direction, and the movable case 113 of the rear axle case 109 and the second axle 122 of the rear axle 110 slide in the same direction via the interlocking member 131, so that the rear wheel 105 also moves in the same direction.

Then, as the cover 153 is brought into contact with the piston 136, the sliding movement of the cylinder body in the outward direction is stopped, thereby stopping the movement of the rear wheel 105.

On the other hand, when the rear wheel 105 is to be moved inwardly from the aforementioned state, hydraulic oil is supplied to the inner oil chamber 140 of the hydraulic cylinder 133 via the hydraulic pressure pipe 151, oil passages 148, 145, and communicating hole 146.

Consequently, the cylinder body 137 slides inwardly, and the movable case 113 of the rear axle case 109 and the second axle 122 of the rear axle 110 slide in the same direction via the interlocking member 131, so that the rear wheel 105 also moves in the same direction.

Then, as the interlocking member 131 is brought into contact with the piston 136 via the stopper 154, the sliding movement of the cylinder body 137 in the inward direction is stopped, so that the movement of the rear wheel 105 stops.

It should be noted that although in this embodiment the hydraulic cylinder is disposed on the rear side of the rear axle in parallel therewith, the hydraulic cylinder may be disposed on an upper or lower portion of the rear axle in parallel therewith or may be disposed concentrically therewith.

What is claimed is:

1. An apparatus for adjusting the tread of steerable wheels of a vehicle, comprising:
    (a) an axle case having a horizontal axis extending transversely of said vehicle and supported by a chassis of said vehicle;
    (b) a pair of movable cases which are respectively inserted into opposite ends of said axle case in such a manner as to be unrotatable about an axis thereof and axially movable;
    (c) a pair of wheel cases arranged on the left-and right-hand sides of said vehicle and each supported by an outer end of said movable case in such a manner as to be rotatable about a diagonally inclined vertical axis;
    (d) a pair of steerable wheels each supported rotatably by said wheel case and having alignment producing running resistance in the direction of returning to straight forward running at the time when said vehicle is steered leftward or rightward;
    (e) a telescopically movable tie rod connecting said pair of wheel cases to each other;
    (f) a steering mechanism for moving said tie rod leftward or rightward;
    (g) a rod lock means for controlling the telescopic movement of said tie rod by remote control; and
    (h) case lock means for controlling the axial movement of each of said movable cases wherein said case lock means comprises a pressure contacting member for bringing said movable case into pressure contact with said axle case, and a hydraulic cylinder for causing said pressure contacting member to be inserted into and withdrawn from a space between said movable case and said axle case.

2. An apparatus for adjusting the tread of steerable wheels of a vehicle according to claim 1, wherein said axle case has at its opposite ends a pair of insertion holes of a circular cross section for allowing said pair of movable cases to be inserted therethrough, respectively, said movable case being formed into a cylindrical body slidably inserted into said insertion hole, a flange being provided on each of said movable cases, said flange having a rotation stopper parallel with an axis of said movable case, and a guide hole being formed in said axle case for receiving said rotation stopper in such as a manner as to allow said rotation stopper to slide therethrough.

3. An apparatus for adjusting the tread of steerable wheels of a vehicle according to claim 1, wherein said pressure contacting member is constituted by a cotter member which is inserted in a cotter insertion hole provided in said axle case perpendicularly of an axial direction of said axle case and is adapted to be brought into contact with an outer peripheral surface of said movable case, said hydraulic cylinder being provided in said axle case, and a piston of said hydraulic cylinder being coupled with said cotter member.

4. An apparatus for adjusting the tread of steerable wheels of a vehicle according to claim 1, wherein said steering mechanism comprises a hydraulic cylinder provided on said axle case in parallel with an axis of said axle case.

5. An apparatus for adjusting the tread of steerable wheels of a vehicle according to claim 1, wherein said tie rod comprises a first rod having an insertion hole formed therein along an axis thereof and a second rod which is slidably inserted into said insertion hole in said first rod.

6. An apparatus for adjusting the tread of steerable wheels of a vehicle according to claim 5, wherein said second rod is provided with a plurality of positioning recesses at predetermined intervals in the axial direction thereof, and said first rod is provided with a positioning member detachably engaged with one of said positioning recesses and a hydraulic device for selectively engaging said positioning member with respect to one of said positioning recesses.

7. An apparatus for adjusting the tread of steerable wheels of a vehicle according to claim 6, wherein each of said positioning recesses is an annular groove formed on an outer peripheral surface of said second rod, and said positioning member is a ball engageable with one of said grooves, said ball being pressed against or disengaged from one of said grooves by a step portion formed on an inner peripheral surface of an axially movable sleeve, and said hydraulic device being adapted to move said sleeve in the axial direction thereof.

8. An apparatus for adjusting the tread of steerable wheels of a vehicle according to claim 7, wherein the axial movement of said sleeve in one direction is effected by a spring, while the axial movement thereof in the other direction is effected by said hydraulic device.

9. An apparatus for adjusting the tread of steerable wheels of a vehicle according to claim 7, wherein said hydraulic device is adapted to reciprocate said sleeve.

10. An apparatus for adjusting the tread of steerable wheels of a vehicle according to claim 6, wherein said positioning recesses are pin holes provided in said second rod, said positioning member is a pin adapted to engage with one of said pin holes, and said hydraulic device is a hydraulic cylinder for allowing said pin to be inserted into and withdrawn from said pin hole.

11. An apparatus for adjusting the tread of steerable wheels of a vehicle according to claim 1, further comprising setting means for setting an amount of movement of said movable case.

12. A method for adjusting the tread in an apparatus for adjusting the tread of steerable wheels of a vehicle, said apparatus including:

an axle case having a horizontal axis extending transversely of said vehicle and supported by a chassis of said vehicle;

a pair of movable cases which are respectively inserted into opposite ends of said axle thereof and axially movable;

a pair of wheel cases arranged on the left- and right-hand sides of said vehicle and each supported by an outer end of said movable case in such a manner as to be rotatable about a diagonally inclined vertical axis;

a pair of steerable wheels each supported rotatably by said wheel case and having alignment producing running resistance in the direction of returning to straight forward running at the time when said vehicle is steered to the left or right;

a telescopically movable tie rod connecting said pair of wheel cases to each other;

a steering mechanism for moving said tie rod leftward or rightward;

a rod lock means for selectively enabling telescopic movement of said tie rod by remote control;

case lock means for allowing or preventing the axial movement of each of said movable cases, said method comprising the steps of:

(a) unlocking said rod lock means by remote control from within an operator's compartment so as to make said tie rod telescopically movable;

(b) moving said tie rod either leftward or rightward by said steering mechanism so as to cause said lock-cancelled tie rod to extend or retract telescopically and causing one of said steerable wheels to be steered with said vehicle set at a standstill;

(c) locking said rod lock means by remote control from within an operator's compartment so as to prevent the telescopic movement of said tie rod;

(d) moving said tie rod by means of said steering mechanism in the opposite direction as to return said steerable wheel to its position of straight forward running, and steering wheel to its position of straight forward running, and steering said steerable wheel on the opposite side with said vehicle set at a standstill;

(e) unlocking said case lock means so as to allow the axial movement of said movable case; and (f) selectively advancing and reversing said vehicle so as to cause said steered steerable wheel to return to its position of straight forward running, whereupon said movable case is extended and retracted.

* * * * *